(12) United States Patent
Yan

(10) Patent No.: US 11,035,941 B2
(45) Date of Patent: Jun. 15, 2021

(54) UWB HIGH-PRECISION POSITIONING SYSTEM, POSITIONING METHOD AND APPARATUS, AND COMPUTER READABLE MEDIUM

(71) Applicant: CHENGDU JINGWEI TECHNOLOGY CO., LTD., Sichuan (CN)

(72) Inventor: Wei Yan, Sichuan (CN)

(73) Assignee: CHENGDU JINGWEI TECHNOLOGY CO., LTD., Chengdu (CN)

( * ) Notice: Subject to any disclaimer, the term of this patent is extended or adjusted under 35 U.S.C. 154(b) by 231 days.

(21) Appl. No.: 16/096,302

(22) PCT Filed: Apr. 21, 2017

(86) PCT No.: PCT/CN2017/081508
§ 371 (c)(1),
(2) Date: Oct. 25, 2018

(87) PCT Pub. No.: WO2017/186068
PCT Pub. Date: Nov. 2, 2017

(65) Prior Publication Data
US 2019/0137613 A1    May 9, 2019

(30) Foreign Application Priority Data
Apr. 27, 2016    (CN) .......................... 201610267637.6

(51) Int. Cl.
*G01S 13/02*    (2006.01)
*G01S 5/10*    (2006.01)
(Continued)

(52) U.S. Cl.
CPC ........ *G01S 13/0209* (2013.01); *G01S 5/0221* (2013.01); *G01S 5/10* (2013.01);
(Continued)

(58) Field of Classification Search
CPC .... G01S 13/0209; G01S 5/0221; G01S 13/08; G01S 13/878
See application file for complete search history.

(56) References Cited

U.S. PATENT DOCUMENTS 6,054,950 A * 4/2000 Fontana .................... G01S 5/14
342/463
7,218,229 B2 * 5/2007 Boyd ....................... G01S 5/021
340/539.1

(Continued)

FOREIGN PATENT DOCUMENTS

| CN | 1645776 A | 7/2005 |
| CN | 103344942 A | 10/2013 |

(Continued)

OTHER PUBLICATIONS

International Search Report of PCT Patent Application No. PCT/CN2017/081508 dated Jun. 29, 2017.
(Continued)

*Primary Examiner* — Marcus E Windrich

(57) ABSTRACT

Provided are a UWB high-precision positioning system, a positioning method and apparatus, and a computer readable medium. The positioning system comprises at least one UWB positioning signal transmitter group, and at least one central controller for controlling the synchronization of the UWB positioning signal transmitter group. Each UWB positioning signal transmitter group comprises N UWB positioning signal transmitters, where N is an integer equal to or greater than three. Wireless communication is realized between any two UWB positioning signal transmitters and between any UWB positioning signal transmitter and the central controller. The positioning system further comprises at least one positioning terminal. The positioning terminal is used for receiving a UWB positioning signal sent by each UWB positioning signal transmitter. Wireless communica- (Continued)

tion is realized between the positioning terminal and the central controller.

13 Claims, 2 Drawing Sheets

(51) Int. Cl.
    *G01S 5/02*     (2010.01)
    *G01S 13/08*     (2006.01)
    *G01S 13/87*     (2006.01)

(52) U.S. Cl.
    CPC ............ *G01S 13/08* (2013.01); *G01S 13/878* (2013.01); *G01S 13/876* (2013.01)

(56) References Cited

U.S. PATENT DOCUMENTS

| | | | | |
|---|---|---|---|---|
| 2004/0108954 | A1* | 6/2004 | Richley | G01S 5/0226 342/387 |
| 2012/0188129 | A1* | 7/2012 | Ameti | G01S 5/021 342/451 |
| 2013/0265198 | A1* | 10/2013 | Stroud | G01S 5/06 342/378 |
| 2013/0294266 | A1* | 11/2013 | Lim | H04W 24/10 370/252 |
| 2015/0092754 | A1* | 4/2015 | Gupta | H04W 4/33 370/336 |
| 2015/0094086 | A1* | 4/2015 | Hedley | G01S 5/06 455/456.1 |
| 2015/0185309 | A1* | 7/2015 | Pu | G01S 5/06 455/456.1 |
| 2016/0291124 | A1* | 10/2016 | Bauer | G01S 5/0081 |
| 2016/0370453 | A1* | 12/2016 | Boker | G01S 5/0221 |
| 2020/0178038 | A1* | 6/2020 | Wang | G01S 5/015 |
| 2020/0191979 | A1* | 6/2020 | Lindskog | G01S 5/0081 |

FOREIGN PATENT DOCUMENTS

| | | |
|---|---|---|
| CN | 104635205 A | 5/2015 |
| CN | 104902564 A | 9/2015 |
| CN | 105282842 A | 1/2016 |
| CN | 105376857 A | 3/2016 |
| CN | 205176258 U | 4/2016 |
| CN | 105929365 A | 9/2016 |
| WO | 2015012767 A1 | 1/2015 |

OTHER PUBLICATIONS

First Office Action of Counterpart Chinese Patent Application No. 201610267637.6 dated Oct. 10, 2017.

\* cited by examiner

UWB HIGH-PRECISION POSITIONING SYSTEM, POSITIONING METHOD AND APPARATUS, AND COMPUTER READABLE MEDIUM

CROSS-REFERENCE TO RELATED APPLICATION

The present application is a 371 U.S. National Phase of International application No. PCT/CN2017/081508, filed on Apr. 21, 2017, which claims the priority to the Chinese patent application No. CN201610267637.6, filed with the Chinese Patent Office on Apr. 27, 2016 and entitled "UWB High-precision Positioning System and Positioning Method", the contents of which are incorporated herein by reference in its entirety.

TECHNICAL FIELD

The present disclosure relates to the field of UWB (Ultra Wideband) high-precision positioning, and particularly to a UWB high-precision positioning system, a positioning method and device (apparatus), and a computer readable medium.

BACKGROUND ART

Most of the existing conventional UWB positioning systems require complicated networking manners, especially a positioning system employing the TDOA (Time Difference of Arrival) algorithm, which requires precise time synchronization control over each positioning signal transmitter or receiver in a same positioning system. Only in the case that the time synchronization control reaches an extremely high precision (with errors below nanosecond level) and the timing circuits of the transmitters or receivers are turned on simultaneously and off simultaneously, a precise difference in time can be ensured, thereby making it possible to calculate the position coordinates of a positioning tag with reference to the known position of each positioning signal transmitter or receiver. Such a system requires a group of complicated and precise time synchronization control network, where each positioning signal transmitter or receiver accesses this network and is controlled uniformly by a synchronization controller. This poses a lot of technical difficulties, since it is very difficult to synchronize the operations of individual positioning signal transmitters or receivers; moreover, the transmission of the synchronization signals in kinds of cables will lead to signal attenuation or distortion, etc., which makes the implementation more difficult.

SUMMARY

An object of the present disclosure is to provide a UWB high-precision positioning system, a positioning method and device, and a computer readable medium, so as to solve the problems that, for the current positioning systems, the synchronization mode is complicated, the synchronization difficulty is great, and the synchronization precision is inevitably affected.

In order to achieve the above object, the following technical solutions are adopted:

A UWB high-precision positioning system, including at least one UWB positioning signal transmitter group, and at least one central controller, the at least one central controller being configured for controlling the synchronization of the at least one UWB positioning signal transmitter group, one UWB positioning signal transmitter group including N UWB positioning signal transmitters, where N is an integer equal to or greater than three, in which wireless communication is realized between any two of the UWB positioning signal transmitters and between any one of the UWB positioning signal transmitters and the at least one central controller.

The system further includes at least one positioning terminal, in which the at least one positioning terminal is configured to receive UWB positioning signal(s) sent from the individual UWB positioning signal transmitters, and wireless communication is realized between the at least one positioning terminal and the at least one central controller.

The system further includes at least one UWB positioning signal receiver at a known position, in which the at least one UWB positioning signal receiver at a known position is configured to receive the UWB positioning signal(s) sent from the individual UWB positioning signal transmitters, and moreover, wireless communication is realized between the at least one UWB positioning signal receiver at a known position and the at least one positioning terminal and between the at least one UWB positioning signal receiver at a known position and the at least one central controller.

Further, as a preferred technical solution, the system includes at least two UWB positioning signal receivers at a known position.

Further, the at least one central controller is configured to send an instruction to the UWB positioning signal transmitters. Each of the UWB positioning signal transmitters is configured to send, after receiving the instruction, the UWB positioning signal at a certain time interval. The at least one central controller is further configured to send a reception instruction. Each positioning terminal and the at least one UWB positioning signal receiver at a known position are configured to synchronously turn on a reception mode after receiving the reception instruction, and wait for the UWB positioning signal. The individual positioning terminals and the at least one UWB positioning signal receiver at a known position are further configured to record, upon receiving different UWB positioning signals, different receiving time to obtain a plurality of timing values. The at least one UWB positioning signal receiver at a known position is further configured to calculate, according to the plurality of timing values obtained, differences in time at which the at least one UWB positioning signal receiver at a known position receives the individual UWB positioning signals. The at least one UWB positioning signal receiver at a known position is further configured to obtain a time correction value of the positioning system, through a TDOA algorithm, by using position coordinates of the at least one UWB positioning signal receiver at a known position and position coordinates of the UWB positioning signal transmitters as well as the differences in time, and transmit the time correction value to the at least one central controller and each positioning terminal. Each positioning terminal is configured to remove, after receiving the time correction value transmitted by the at least one UWB positioning signal receiver at a known position, an offset and an error caused by rough synchronization control and circuit time fluctuation in the positioning terminal based on the time correction value, to obtain a timing amount corresponding only to the distance between the positioning terminal and a respective positioning signal transmitter, and calculate position coordinates of the positioning terminal through the TDOA algorithm.

A positioning method based on the UWB high-precision positioning system, including the following steps:

(a) the at least one central controller sending an instruction to the UWB positioning signal transmitters, and each of the UWB positioning signal transmitters sending, after receiving the instruction, a UWB positioning signal at a certain time interval; (b) the at least one central controller sending a reception instruction, and each positioning terminal and UWB positioning signal receiver at a known position synchronously turning on a reception mode and waiting for the arrival of the UWB positioning signal; (c) each positioning terminal and the at least one UWB positioning signal receiver at a known position recording, upon receiving different UWB positioning signals, different receiving time to obtain a plurality of timing values; (d) calculating, according to the plurality of timing values obtained in step (c), differences in time at which the at least one UWB positioning signal receiver at a known position receives the individual UWB positioning signals; (e) obtaining, through a TDOA algorithm, a time correction value of the positioning system by using position coordinates of the at least one UWB positioning signal receiver at a known position and position coordinates of the UWB positioning signal transmitters as well as the differences in time obtained in step (d), and transmitting, through a special wireless communication channel, the time correction value to the at least one central controller and each positioning terminal; and (f) each positioning terminal receiving the time correction value transmitted by the at least one UWB positioning signal receiver at a known position, removing based on the time correction value an offset and an error caused by rough synchronization control and circuit time fluctuation in the positioning terminal, to obtain a timing amount corresponding only to the distance between the positioning terminal and a respective positioning signal transmitter, and calculating position coordinates of the positioning terminal through the TDOA algorithm.

Further, as a preferred technical solution, the step (b) includes:

(b1) the at least one central controller sending a control instruction, and each positioning terminal and the at least one UWB positioning signal receiver at a known position synchronously turning on a reception mode; (b2) each positioning terminal and the at least one UWB positioning signal receiver at a known position resetting their multiple high-precision clocks while synchronously turning on the reception mode; and (b3) the high-precision clocks of each positioning terminal and the at least one UWB positioning signal receiver at a known position starting timing, and waiting for the arrival of the UWB positioning signal.

Further, as a preferred technical solution, the step (c) includes:

(c1) each positioning terminal and the at least one UWB positioning signal receiver at a known position starting receiving synchronously the UWB positioning signal; (c2) the at least one UWB positioning signal receiver at a known position stopping, upon receiving a first arriving UWB positioning signal, one high-precision clock corresponding to the first arriving UWB positioning signal to obtain a timing value; similarly, the at least one UWB positioning signal receiver at a known position stopping, upon receiving a second arriving UWB positioning signal, one high-precision clock corresponding to the second arriving UWB positioning signal to obtain another timing value, et cetera; and (c3) the at least one UWB positioning signal receiver at a known position stopping, upon receiving a last arriving UWB positioning signal, one high-precision clock corresponding to the last arriving UWB positioning signal to obtain a last timing value.

Further, as a preferred technical solution, the difference in time in step (d) refers to a difference in time at which any two different UWB positioning signals arrive at a same UWB positioning signal receiver at a known position.

Further, as a preferred technical solution, there are at least two UWB positioning signal receivers at a known positions, and the at least two UWB positioning signal receivers at a known positions each send the calculated time correction value to the at least one central controller and/or each positioning terminal; in step (f), each positioning terminal averages, after receiving the time correction values transmitted by the UWB positioning signal receivers at a known position, the received time correction values to obtain an average value, uses the average value as a time correction value of the positioning terminal, and removes, based on the time correction value, an offset and an error caused by rough synchronization control and circuit time fluctuation in the positioning terminal, to obtain a timing amount corresponding only to the distance between the positioning terminal and a respective positioning signal transmitter, and calculates position coordinates of the positioning terminal through the TDOA algorithm.

A positioning method of a UWB high-precision positioning system, which is applicable to a UWB positioning signal receiver in a UWB high-precision positioning system, and the method includes: recording, upon receiving different UWB positioning signals sent from different UWB positioning signal transmitters at a certain time interval, different receiving time to obtain a plurality of timing values; calculating, according to the plurality of timing values, differences in time at which the UWB positioning signals are received; and obtaining a time correction value of the positioning system through a TDOA algorithm by using position coordinates of the UWB positioning signal receiver and position coordinates of the UWB positioning signal transmitters as well as the differences in time, and sending the time correction value to a positioning terminal, so that the positioning terminal can calculate the position coordinates of the positioning terminal according to the time correction value.

Further, as a preferred technical solution, the time correction value is transmitted, through a special wireless communication channel, to the central controller and each positioning terminal.

Further, as a preferred technical solution, the step of recording, upon receiving different UWB positioning signals sent from different UWB positioning signal transmitters at a certain time interval, different receiving time to obtain a plurality of timing values includes: stopping, upon receiving a first arriving UWB positioning signal, one high-precision clock corresponding to the first arriving UWB positioning signal to obtain a timing value; similarly, stopping, upon receiving a second arriving UWB positioning signal, one high-precision clock corresponding to the second arriving UWB positioning signal to obtain another timing value, et cetera; and stopping, when a last arriving UWB positioning signal is received, one high-precision clock corresponding to the last arriving UWB positioning signal, to obtain a last timing value.

A positioning method of a UWB high-precision positioning system, which is applicable to a UWB positioning terminal in a UWB high-precision positioning system, the method includes: recording, upon receiving different UWB positioning signals sent from different UWB positioning signal transmitters at a certain time interval, different receiving time to obtain a plurality of timing values; receiving a time correction value transmitted by each of the UWB positioning signal receivers; removing, based on the time correction value, an offset and an error caused by rough synchronization control and circuit time fluctuation in the positioning terminal, to obtain a timing amount corresponding only to the distance between the positioning terminal and a respective UWB positioning signal transmitter; and calculating, according to the timing amount, position coordinates of the positioning terminal through the TDOA algorithm.

Further, as a preferred technical solution, in a case where time correction values transmitted by at least two UWB positioning signal receivers are received, the received time correction values are averaged to obtain an average value, and the average value is used as a time correction value of the positioning terminal.

A positioning device of a UWB high-precision positioning system, which is applicable to a UWB positioning signal receiver in a UWB high-precision positioning system, the device includes: a timing value acquisition module, configured to record, upon receiving different UWB positioning signals sent at a certain time interval from different UWB positioning signal transmitters, different receiving time to obtain a plurality of timing values; a time difference calculation module, configured to calculate, according to the plurality of timing values, differences in time at which the UWB positioning signals are received; and a time correction value calculation module, configured to obtain a time correction value of the positioning system through a TDOA algorithm, by using position coordinates of the UWB positioning signal receiver and position coordinates of the UWB positioning signal transmitters as well as the difference in time, and send the time correction value to a positioning terminal, so that the positioning terminal calculates its own positioning coordinates according to the time correction value.

A positioning device of a UWB high-precision positioning system, which is applicable to a UWB positioning terminal in a UWB high-precision positioning system, the device including: a timing value receiving module, configured to record, upon receiving different UWB positioning signals sent at a certain time interval from different UWB positioning signal transmitters, different receiving time to obtain a plurality of timing values; a time correction value receiving module, configured to receive a time correction value transmitted by a UWB positioning signal receiver; a timing amount calculation module, configured to remove, based on the time correction value, an offset and an error caused by rough synchronization control and circuit time fluctuation in the positioning terminal, to obtain a timing amount corresponding only to the distance between the positioning terminal and a corresponding respective UWB positioning signal transmitter; and a position coordinate calculation module, configured to calculate, according to the timing amount, position coordinates of the positioning terminal through a TDOA algorithm.

According to the present disclosure, a computer readable medium is provided including non-volatile program codes executable by a processor, and the program code enables the processor to execute the above methods, when being executed by the processor.

Compared with the existing technology, the present disclosure has the following advantages and beneficial effects:

(1) The conventional UWB positioning base station needs to realize UWB signal reception, control channel reception and logic control, and also needs to realize network communication, time synchronization, etc., which results in a huge network of the entire UWB positioning system, while the present disclosure saves the parts of network communication and time synchronization, greatly simplifies the network of UWB positioning system, and realizes cable-free connection between the positioning signal transmitters and the central controller, which facilitates the layout and installation of the whole system.

(2) In the present disclosure, a UWB position signal receiver at a known position is used, by calculating the difference in time at which the UWB positioning signals sent from the individual UWB positioning signal transmitters arrive at the UWB positioning signal receiver at a known position, the random fluctuation values, such as the system communication channel transmission time and the hardware circuit delay time, are skillfully calculated, and every calculated fluctuation value is transmitted to the positioning terminal, and through the positioning terminal, the timing value of each of the UWB positioning signal transmitters is corrected, thereby realizing precise synchronization without laying out a time synchronization control network with great difficulty, which greatly reduces the complexity of the system and also reduces the costs of the whole positioning system, while realizing high-precision positioning.

(3) In the present disclosure, the positioning terminals perform positioning calculation through their respective internal systems to calculate their respective position coordinates without calculation by a positioning engine of the system, which realizes distributed arithmetic of the system, and also greatly simplifies the structure of the positioning signal transmitter, realizing micropower and miniaturization as compared with the existing positioning base station.

(4) Since all the positioning terminals in the system receive the same signals sent from the positioning signal transmitters at each positioning and calculate their respective position coordinates, there is no capacity limitation of positioning terminals and any scale of positioning can be realized.

DETAILED DESCRIPTION OF EMBODIMENTS

Figure 1:
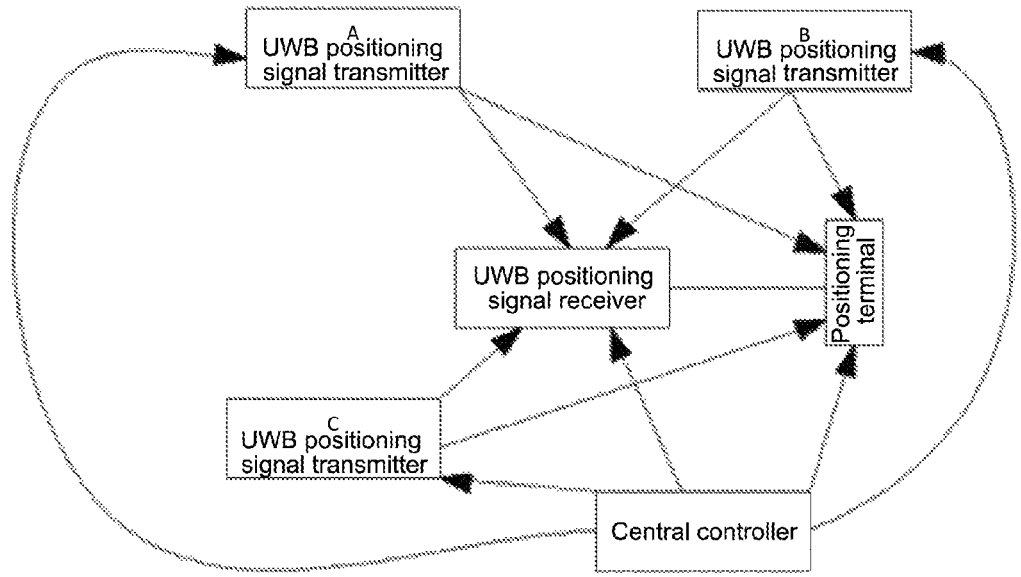
FIG. 1 is an overall structural schematic diagram of a UWB high-precision positioning system according to an embodiment of the present disclosure.

In order to make the objects, technical solutions and advantages of the embodiments of the present disclosure clearer, the technical solutions of the embodiments of the present disclosure will be described clearly and completely below with reference to the drawings of the embodiments of the present disclosure. Apparently, the described embodiments are some of the embodiments of the present disclosure, rather than all of the embodiments. The components of the embodiments of the present disclosure described and illustrated in the drawings herein can generally be arranged and designed in a variety of different configurations. Thus, the following detailed description of the embodiments of the present disclosure provided in the drawings is not intended to limit the scope of protection of the present disclosure, but only illustrates the selected embodiments of the present disclosure. All the other embodiments that are obtained by those skilled in the art without inventive effort on the basis of the embodiments of the present disclosure shall be covered by the scope of protection of the present disclosure.

The present disclosure will be further described in detail below in connection with the embodiments, but the implementation modes of the present disclosure are not limited thereto.

Embodiment 1

The UWB high-precision positioning system according to this embodiment includes at least one UWB positioning signal transmitter group, and at least one central controller, the at least one central controller being configured for controlling the synchronization of the at least one UWB positioning signal transmitter group, one UWB positioning signal transmitter group including N UWB positioning signal transmitters, where N is an integer equal to or greater than three. Wireless communication is realized between any two of the UWB positioning signal transmitters and between any one of the UWB positioning signal transmitters and the at least one central controller. Of course, in this embodiment, the specific communication manners between the positioning signal transmitters and between any one of the UWB positioning signal transmitters and the at least one central controller are not limited thereto, but may be determined according to needs.

The present embodiment further includes at least one positioning terminal. The at least one positioning terminal is configured to receive a UWB positioning signal(s) sent from the individual UWB positioning signal transmitters. Wireless communication is realized between the at least one positioning terminal and the at least one central controller. Generally, the at least one positioning terminal may be a terminal device that needs to be positioned, which may be a mobile phone, a computer or other electronic devices, that is not limited in this embodiment.

The present embodiment further includes at least one UWB positioning signal receiver at a known position. The at least one UWB positioning signal receiver at a known position is configured to receive a UWB positioning signal(s) sent from the individual UWB positioning signal transmitters. Moreover, wireless communication is realized between the at least one UWB positioning signal receiver at a known position and the at least one positioning terminal and between the at least one UWB positioning signal receiver at a known position and the at least one central controller.

In this embodiment, the number of UWB positioning signal transmitter groups and the number of UWB positioning signal transmitters in each UWB positioning signal transmitter group can be determined according to needs. In order to implement two-dimensional positioning, at least three of the UWB positioning signal transmitters are required. As shown in FIG. 1, taking the case, where there are three of the UWB positioning signal transmitters and one positioning terminal, as an example, the implementation process of the present disclosure is described specifically as follows:

It is assumed that the three of the UWB positioning signal transmitters are UWB positioning signal transmitter A, UWB positioning signal transmitter B and UWB positioning signal transmitter C, and the transmitted positioning signals are UWB positioning signal A, UWB positioning signal B and UWB positioning signal C, respectively.

The UWB positioning signal transmitter A transmits a UWB signal at time Ta; the UWB positioning signal transmitter B transmits a UWB signal at time Tb=Ta+Tba; the UWB positioning signal transmitter C transmits a UWB signal at time Tc=Ta+Tba+Tcb. Specifically, Ta<Tb<Tc, Tba is the time interval between the signal transmissions of the UWB positioning signal transmitter A and the UWB positioning signal transmitter B, and Tcb is the time interval between the signal transmissions of the UWB positioning signal transmitter B and the UWB positioning signal transmitter C.

The positioning terminal and the UWB positioning signal receiver at a known position simultaneously receive the UWB positioning signals transmitted by the UWB positioning signal transmitter A, the UWB positioning signal transmitter B and the UWB positioning signal transmitter C.

The time at which the UWB positioning signal receiver at a known position receives the UWB positioning signal(s) sent from the UWB positioning signal transmitter A, the UWB positioning signal transmitter B and the UWB positioning signal transmitter C are:

1. the time at which the UWB positioning signal A is received is TtimeA, where TtimeA includes flight time of the UWB positioning signal, system communication channel transmission time, Ta and hardware circuit delay time;

2. the time at which the UWB positioning signal B is received is TtimeB, where TtimeB includes flight time of the UWB positioning signal, system communication channel transmission time, Tb and hardware circuit delay time;

3. the time at which the UWB positioning signal C is received is TtimeC, where TtimeC includes flight time of the UWB positioning signal, system communication channel transmission time, Tc and hardware circuit delay time.

Note: The above mentioned "system communication channel transmission time, Ta, Tb, Tc, hardware circuit delay time" are fluctuated randomly, that is, these timing values may be different each time the UWB positioning synchronization signal is transmitted.

Assuming that the time delay value, which may also be referred to as time correction value, between the UWB positioning signal transmitter A and the UWB positioning signal transmitter B, due to the hardware circuit and the system communication channel transmission, is Txz_BA, then the difference in time at which the UWB positioning signal receiver at a known position receives the UWB positioning signal A and the time at which the UWB positioning signal receiver at a known position receives the UWB positioning signal B is BTDOA_ba=TtimeB−TtimeA+Txz_BA, and it is understandable that the difference in time is a difference in time added with a time correction value.

Similarly, assuming that the time delay value, which may also be referred to as a fluctuation value, between the UWB positioning signal transmit A and UWB positioning signal transmitter C, due to the hardware circuit and the system communication channel transmission, is Txz_CA, then the difference in time at which the UWB positioning signal receiver at a known position receives the UWB positioning signal A and the time at which the UWB positioning signal receiver at a known position receives the UWB positioning signal C is TDOA_ca=TtimeC−TtimeA+Txz_CA, and it is also understandable that the difference in time is a difference in time added with a time correction value.

Since the coordinates of the UWB positioning signal transmitter A, the UWB positioning signal transmitter B, the UWB positioning signal transmitter C and the UWB positioning signal receiver at a known position are known, Txz_BA and Txz_CA can be calculated according to the TDOA algorithm.

The UWB positioning signal receiver at a known position transmits the obtained Txz_BA and Txz_CA values to the positioning terminal through a system communication channel. The positioning terminal uses the received Txz_BA and Txz_CA values as time correction values and correspondingly corrects the differences in time at which different UWB positioning signals are received.

Since the positioning terminal and the UWB positioning signal receiver at a known position receive the same UWB positioning signal in one positioning, the time correction value for correcting the differences in time of the positioning terminal is the same as the time correction value of the UWB positioning signal receiver at a known position.

Since Txz_BA and Txz_CA received by the positioning terminal are known and the position coordinates of the UWB positioning signal transmitter A, the UWB positioning signal transmitter B and the UWB positioning signal transmitter C are also known. Moreover, the time at which the positioning terminal receives the UWB positioning signals are also known. The only unknown is the position coordinates of the positioning terminal. Therefore, the position coordinates of the positioning terminal can be calculated just through the TDOA algorithm.

In addition, in the present embodiment, high-precision positioning can be achieved by the following positioning method, which specifically includes the following steps:

(a) The central controller sends an instruction to the UWB positioning signal transmitters, and each of the UWB positioning signal transmitters, after receiving the instruction, sends a UWB positioning signal at a certain time interval. Specifically, the time at which the individual UWB positioning signal transmitters transmit a signal are in a certain order; the time at which any two of the UWB positioning signal transmitters transmit a signal are not the same. There is no strict requirement for the range of the time intervals, as long as there is no time overlapping of Flight between different UWB positioning signals, that means there is no occurrence of the case where at least two different UWB positioning signals overlap simultaneously at a same position, and it must be the case that the UWB positioning signal receiver has completely received a UWB positioning signal sent from one UWB positioning signal transmitter and then another UWB positioning signal transmitter begins to send a UWB positioning signal, which avoids mutual interference between different UWB signals. Accordingly, the time interval in this embodiment can be at microsecond level, because the positioning precision in the present disclosure can reach nanosecond level. Therefore, the time interval at microsecond level is sufficient to ensure that no two UWB positioning signals will overlap at a same position. For the UWB positioning signals, due to the differences in distances between the central controller and each of the UWB positioning signal transmitters and the problem of the hardware circuit delay, that causes each of the UWB positioning signal transmitters does not transmit a positioning signal according to a set time interval value, that is, there is an error at the transmission time point.

(b) The central controller sends a reception instruction, and each positioning terminal and the UWB positioning signal receiver at a known position turn on a reception mode synchronously, and wait for the arrival of the UWB positioning signal.

Further, in this embodiment, each positioning terminal and the UWB positioning signal receiver at a known position reset their multichannel high-precision clocks while turning on the reception mode. Specifically to the positioning terminal, each high-precision clock of the multichannel high-precision clocks of the positioning terminal corresponds to one UWB positioning signal. In the process of starting synchronous reception, since the positioning terminals and the UWB positioning signal receiver at a known position are at different distances from the central controller and the system communication channel has a time delay in transmission, the positioning terminal and the UWB positioning signal receiver at a known position do not turn on the reception mode in a strictly synchronization manner, that is, there is an error in synchronization.

(c) Each positioning terminal and the UWB positioning signal receiver at a known position record, upon receiving different UWB positioning signals, different receiving time to obtain a plurality of timing values. Specifically, each positioning terminal and the UWB positioning signal receiver at a known position start to receive the UWB positioning signals synchronously, where the UWB positioning signal receiver at a known position, upon receiving a first arriving UWB positioning signal, stops one high-precision clock corresponding to the first arriving UWB positioning signal to obtain a first timing value; similarly, the UWB positioning signal receiver at a known position, upon receiving a second arriving UWB positioning signal, stops one high-precision clock corresponding to the second arriving UWB positioning signal to obtain a second timing value, et cetera; the UWB positioning signal receiver at a known position, upon receiving a last arriving UWB positioning signal, stops one high-precision clock corresponding to the last arriving UWB positioning signal to obtain a last timing value.

(d) According to the plurality of timing values obtained in step (c), the differences in time at which the UWB positioning signal receiver at a known position receives individual UWB positioning signals, i.e., the difference in time at which any two different UWB positioning signals arrives at a same UWB positioning signal receiver at a known position, is calculated.

(e) In order to achieve strict synchronization among the individual UWB positioning signal transmitters, it is assumed that there is a time correction value between any two of the UWB positioning signal transmitters, then the time correction value needs to be added for calculating the difference in time at which two of the UWB positioning signals are received, so as to ensure precise synchronization. As described above, the specific numerical value of a time correction value between any two of the UWB positioning signal transmitters can then be obtained through the TDOA algorithm, according to the position coordinates of the UWB positioning signal receivers at a known position, the position coordinates of the UWB positioning signal transmitters and the differences in time at which the UWB positioning signal receiver at a known position receives the individual UWB positioning signals in step (d), and then the time correction value is transmitted to the central controller and each positioning terminal, specifically, the transmission can be performed, through a special wireless communication channel.

(f) Each positioning terminal receives the time correction value transmitted by the UWB positioning signal receiver at a known position, and based on the time correction value in combination with the known position coordinates of each of the UWB positioning signal transmitters and the known difference in time between any two UWB positioning signal transmitters, then the position coordinates of the positioning terminal is calculated through the TDOA algorithm, thereby achieving the positioning. The time correction value can also be understood as the offset and error in the positioning terminal caused by rough synchronization control and hardware circuit time fluctuation. That is, by calculating, through the UWB positioning signal receiver at a known position, the time correction value in each process which is from sending a UWB positioning signal to receiving the UWB positioning signal, it is possible to obtain timing amounts corresponding only to the distances between the positioning terminal and a respective UWB positioning signal transmitters, and by removing all the offsets and errors, high-precision positioning can be achieved.

Embodiment 2

The present embodiment is substantially the same as Embodiment 1 except that at least two UWB positioning signal receivers at a known positions are used, where the working principle of each UWB positioning signal receiver at a known position is the same as that in Embodiment 1, and the differences lie in that, after each UWB positioning signal receiver at a known position calculates the time correction value and transmits the time correction value to the positioning terminal, the positioning terminal averages the received time correction values to obtain an average value, and then correspondingly back calculates the position coordinates of the positioning terminal by using the average value as the time correction value of the positioning terminal. In this way, the precision of the time correction value can be further improved, which thereby is beneficial to the improvement of the positioning precision of the whole system.

Embodiment 3

Figure 2:
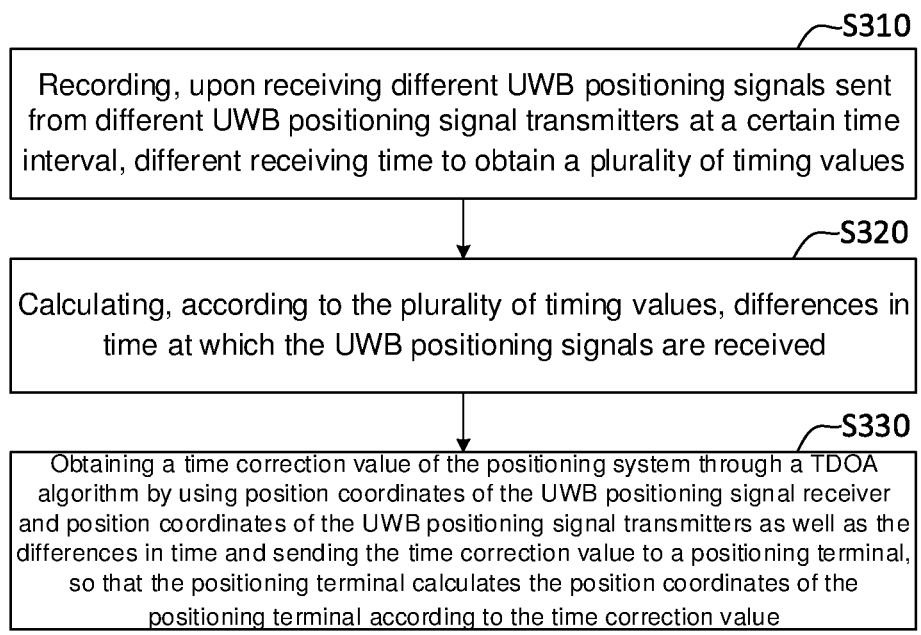
FIG. 2 is a flowchart of a positioning method of a UWB high-precision positioning system according to an embodiment of the present disclosure.

This embodiment provides a positioning method of a UWB high-precision positioning system, which is applicable to a UWB positioning signal receiver in the above-mentioned UWB high-precision positioning system. Referring to FIG. 2, the method includes:

Step S310, recording, upon receiving different UWB positioning signals respectively sent from different UWB positioning signal transmitters at a certain time interval, different receiving time to obtain a plurality of timing values.

Further, in this step, when the UWB positioning signal receiver receives the first arriving UWB positioning signal, one high-precision clock corresponding to the first arriving UWB positioning signal is stopped and a timing value is obtained; similarly, after the UWB positioning signal receiver receives the second arriving UWB positioning signal, one high-precision clock corresponding to the second arriving UWB positioning signal is obtained and another timing value is obtained, et cetera; when the UWB positioning signal receiver receives a last arriving UWB positioning signal, one high-precision clock corresponding to the last arriving UWB positioning signal is stopped and a last timing value is obtained.

Step S320, calculating, according to the plurality of timing values, differences in time at which the individual UWB positioning signals are received.

Step S330, obtaining a time correction value of the positioning system through the TDOA algorithm, by using position coordinates of the UWB positioning signal receiver and position coordinates of the UWB positioning signal transmitters as well as the differences in time and sends the time correction value to the positioning terminal, so that the positioning terminal calculates its own position coordinates according to the time correction value.

In the above, the UWB positioning signal receiver transmits, through a special wireless communication channel, the time correction value to each positioning terminal. Further, the UWB positioning signal receiver also transmits the time correction value to the central controller, and a special wireless communication channel can be used for this transmission.

Embodiment 4

Figure 3:
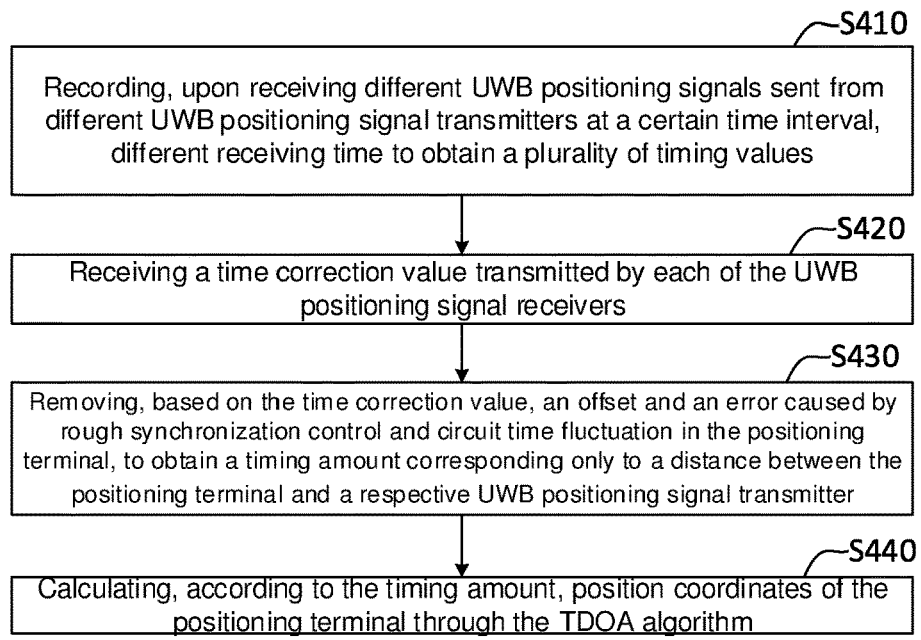
FIG. 3 is another flowchart of a positioning method of a UWB high-precision positioning system according to an embodiment of the present disclosure.

This embodiment provides a positioning method of a UWB high-precision positioning system, which is applicable to a UWB positioning terminal in the above-mentioned UWB high-precision positioning system. Referring to FIG. 3, the method includes:

Step S410, recording, upon receiving different UWB positioning signals respectively sent from different UWB positioning signal transmitters at a certain time interval, different receiving time to obtain a plurality of timing values.

Step S420, receiving a time correction value transmitted by each of the UWB positioning signal receivers.

Further, in this step, in a case where time correction values transmitted by at least two UWB positioning signal receivers are received, the received time correction values are averaged to obtain an average value, and the average value is used as the time correction value of the positioning terminal.

Step S430, removing, based on the time correction value, an offset and an error caused by rough synchronization control and circuit time fluctuation in the positioning terminal, to obtain timing amounts corresponding only to the distances between the positioning terminal and respective UWB positioning signal transmitters.

Step S440, calculating, according to the timing amounts, the position coordinates of the positioning terminal through the TDOA algorithm.

Embodiment 5

Figure 4:
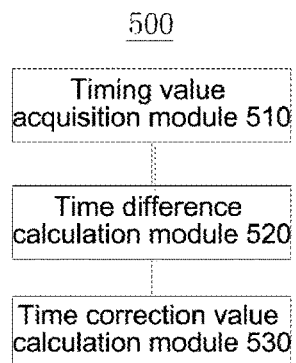
FIG. 4 is a functional module diagram of a positioning device of a UWB high-precision positioning system according to an embodiment of the present disclosure.

This embodiment provides a positioning device 500 of a UWB high-precision positioning system, which is applicable to a UWB positioning signal receiver in the above-mentioned UWB high-precision positioning system. Referring to FIG. 4, the device 500 includes:

a timing value acquisition module 510, configured to record, upon receiving different UWB positioning signals respectively sent from different UWB positioning signal transmitters at a certain time interval, different receiving time to obtain a plurality of timing values; a time difference calculation module 520, configured to calculate, according to the plurality of timing values, differences in time at which the individual UWB positioning signals are received; and a time correction value calculation module 530, configured to obtain, by using the position coordinates of the time correction value calculation module and the position coordinates of the UWB positioning signal transmitters as well as the difference in time, a time correction value of the positioning system through the TDOA algorithm, and send the time correction value to a positioning terminal, so that the positioning terminal calculates its own position coordinates according to the time correction value.

Embodiment 6

Figure 5:
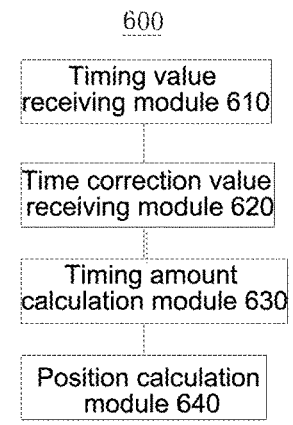
FIG. 5 is another functional module diagram of a positioning device of a UWB high-precision positioning system according to an embodiment of the present disclosure.

A positioning device 600 of a UWB high-precision positioning system, which is applicable to a UWB positioning terminal in the above-mentioned UWB high-precision positioning system, referring to FIG. 5, the device 600 includes: a timing value receiving module 610, configured to record, upon receiving different UWB positioning signals respectively sent from different UWB positioning signal transmitters at a certain time interval, different receiving time to obtain a plurality of timing values; a time correction value receiving module 620, configured to receive a time correction value transmitted by a UWB positioning signal receiver; a timing amount calculation module 630, configured to remove, based on the time correction value and the timing values, an offset and an error caused by rough synchronization control and circuit time fluctuation in the positioning terminal, to obtain a timing amount corresponding only to the distance between the positioning terminal and a respective UWB positioning signal transmitter; and a position coordinate calculation module 640, configured to calculate, according to the timing amount, the position coordinates of the positioning terminal through the TDOA algorithm.

It should be noted that the individual embodiments in the description are all described in a progressive manner, and each embodiment focuses on the aspects by which it differs from other embodiments, and as to the same or similar aspects among the embodiments, mutually reference can be made. For the device-related embodiments and the method-related embodiments corresponding to the UWB positioning signal receiver and the UWB positioning terminal, since they are substantially similar to the embodiments corresponding to the positioning systems and the method-related embodiments corresponding to the positioning systems, only brief description is provided; and as to the related details, references can be made to the corresponding part of illustration of the embodiments corresponding to the positioning systems and the method-related embodiments corresponding to the positioning systems.

In the several embodiments provided in the present disclosure, it should be understood that the devices and the methods disclosed can also be implemented in other manners. The device embodiments described above are merely schematic, for example, the flow diagrams and the block diagrams in the drawings show the system architectures, functions and operations that may be implemented according to the devices, methods and computer program products in the embodiments of the present disclosure. In this regard, each box in the flow diagram or block diagram may represent a module, a program segment or a part of codes, which includes one or more executable instructions for implementing a specified logic function. It should also be noted that in some alternative implementations, the functions indicated in the box can also occur in an order different from the order indicated in the figures. For example, the functions indicated in two consecutive boxes actually can be realized substantially in parallel, or they may sometimes be realized in a reverse order, which is determined according to the functions involved. It should further be noted that each box in the block diagram and/or the flow diagram, and a combination of the boxes in the block diagram and/or the flow diagram can be implemented by a special hardware-based system executing predetermined functions or actions, or can be implemented by a combination of special hardware and computer instructions.

In addition, the functional modules in each of the embodiments of the present disclosure can be integrated to form an independent part, each of the modules can exist independently, or two or more of the modules can be integrated to form an independent part.

The functions, in the case of being implemented in a form of software functional modules and sold or used as independent products, can be stored in a computer readable storage medium. Based on such understanding, the essence of the technical solution of the present disclosure, or the part of the technical solution of the present disclosure that makes contributions to the prior art, or a part of the technical solution can be embodied in a form of a software product, and the computer software product is stored in a storage medium, including some instructions for enabling one computer device (which can be a personal computer, a server, a network device or the like) to execute all or some of the steps of the methods in the embodiments of the present disclosure. The storage medium includes individual mediums capable of storing program codes, such as a USB flash drive, a mobile hard disk, a Read-Only Memory (ROM), a Random Access Memory (RAM), a magnetic disk, or an optical disk. It should be noted that, in the text, the relational terms such as "first" and "second" are only used to distinguish one entity or operation from another entity or operation, and do not necessarily require or imply that any such actual relationship or sequence exists between these entities or operations. Moreover, the term "comprising", "including", or any other variant thereof is intended to encompass a non-exclusive inclusion, so that the process, method, article or device including a series of elements not only includes those elements, but also includes other elements not explicitly listed, or further includes inherent elements of the process, method, article or device. In cases where no further limitations are made, the element defined with the statement "including one . . . " does not exclude the case that other identical elements further exist in the process, method, article or device including the elements.

The descriptions above are only preferable embodiments of the present disclosure, which are not used to limit the present disclosure. For those skilled in the art, the present disclosure may have individual changes and variations. Any modifications, equivalent substitutions, improvements etc. within the spirit and principle of the present disclosure shall all be included in the scope of protection of the present disclosure. It should be noted that similar reference signs and letters denote similar items in the accompanying drawings, and therefore, once a certain item is defined in one drawing, it does not need to be further defined and explained in the subsequent drawings.

The above description is only the preferred embodiments of the present disclosure, and does not limit the present disclosure in any form, and any simple modification or equivalent change made to the above embodiments according to the technical essence of the present disclosure shall fall within the protection scope of the present disclosure.

The invention claimed is:

1. A positioning method applicable to an Ultra Wideband (UWB) high-precision positioning system, wherein the UWB high-precision positioning system comprises at least one UWB positioning signal transmitter group, and at least one central controller, the at least one central controller being configured for controlling synchronization of the at least one UWB positioning signal transmitter group, one UWB positioning signal transmitter group comprising N UWB positioning signal transmitters, where N is an integer equal to or greater than three, wherein wireless communication is executed between any two of the UWB positioning signal transmitters and between any one of the UWB positioning signal transmitters and the at least one central controller;

the system further comprises at least one positioning terminal, wherein the at least one positioning terminal is configured to receive a UWB positioning signal(s) sent from the individual UWB positioning signal transmitters, and wireless communication is executed between the at least one positioning terminal and the at least one central controller; and the system further comprises at least one UWB positioning signal receiver at a known position, wherein the at least one UWB positioning signal receiver at a known position is configured to receive the UWB positioning signal(s) sent from the individual UWB positioning signal transmitters, and moreover, wireless communication is executed between the at least one UWB positioning signal receiver at a known position and the at least one positioning terminal and between the at least one UWB positioning signal receiver at a known position and the at least one central controller;

the positioning method comprises following steps:
(a) the at least one central controller sending an instruction to the UWB positioning signal transmitters, and each of the UWB positioning signal transmitters sending, after receiving the instruction, a UWB positioning signal at a certain time interval;
(b) the at least one central controller sending a reception instruction, and each positioning terminal and the at least one UWB positioning signal receiver at a known position, after receiving the reception instruction, synchronously turning on a reception mode and waiting for arrival of the UWB positioning signal;
(c) each positioning terminal and the at least one UWB positioning signal receiver at a known position recording, upon receiving different UWB positioning signals, different receiving time to obtain a plurality of timing values;
(d) calculating, according to the plurality of timing values obtained in step (c), differences in time at which the at least one UWB positioning signal receiver at a known position receives the individual UWB positioning signals;
(e) obtaining, through a Time Difference of Arrival (TDOA) algorithm, a time correction value of the positioning system by using position coordinates of the at least one UWB positioning signal receiver at a known position and position coordinates of the UWB positioning signal transmitters as well as the differences in time obtained in step (d), and transmitting, through a special wireless communication channel, the time correction value to the at least one central controller and each positioning terminal; and
(f) each positioning terminal receiving the time correction value transmitted by the at least one UWB positioning signal receiver at a known position, removing based on the time correction value an offset and an error caused by rough synchronization control and circuit time fluctuation in the positioning terminal, to obtain a timing amount corresponding only to a distance between the positioning terminal and a respective positioning signal transmitter, and calculating position coordinates of the positioning terminal through the TDOA algorithm.

2. The positioning method according to claim 1, wherein the step (b) comprises:
(b1) the at least one central controller sending a reception instruction, and each positioning terminal and the at least one UWB positioning signal receiver at a known position synchronously turning on a reception mode;
(b2) each positioning terminal and the at least one UWB positioning signal receiver at a known position resetting their multiple high-precision clocks while synchronously turning on the reception mode; and
(b3) the high-precision clocks of each positioning terminal and the at least one UWB positioning signal receiver at a known position starting timing, and waiting for the arrival of the UWB positioning signal.

3. The positioning method according to claim 1, wherein the step (c) comprises:
(c1) each positioning terminal and the at least one UWB positioning signal receiver at a known position starting receiving synchronously the UWB positioning signal;
(c2) the at least one UWB positioning signal receiver at a known position stopping, upon receiving a first arriving UWB positioning signal, one high-precision clock corresponding to the first arriving UWB positioning signal to obtain a timing value; similarly, the at least one UWB positioning signal receiver at a known position stopping, upon receiving a second arriving UWB positioning signal, one high-precision clock corresponding to the second arriving UWB positioning signal to obtain another timing value, et cetera; and
(c3) the at least one UWB positioning signal receiver at a known position stopping, upon receiving a last arriving UWB positioning signal, one high-precision clock corresponding to the last arriving UWB positioning signal to obtain a last timing value.

4. The positioning method according to claim 1, wherein the difference in time in step (d) refers to a difference in time at which any two different UWB positioning signals arrive at a same UWB positioning signal receiver at a known position.

5. The positioning method according to claim 1, comprising at least two UWB positioning signal receivers at a known position, wherein the at least two UWB positioning signal receivers at a known position each send the calculated time correction value to the at least one central controller and/or each positioning terminal;
in step (f), each positioning terminal averages, after receiving the time correction values transmitted by the at least two UWB positioning signal receivers at a known position, the received time correction values to obtain an average value, and uses the average value as a time correction value of the positioning terminal, to remove, based on the time correction value, an offset and an error caused by rough synchronization control and circuit time fluctuation in the positioning terminal, to obtain a timing amount corresponding only to the distance between the positioning terminal and a respective positioning signal transmitter, and calculates position coordinates of the positioning terminal through the TDOA algorithm.

6. A positioning method of an Ultra Wideband (UWB) high-precision positioning system, wherein the method is applicable to a UWB positioning signal receiver in a UWB high-precision positioning system, and the method comprises:

recording, upon receiving different UWB positioning signals sent from different UWB positioning signal transmitters at a certain time interval, different receiving time to obtain a plurality of timing values;

calculating, according to the plurality of timing values, differences in time at which the UWB positioning signals are received; and obtaining a time correction value of the positioning system through a Time Difference of Arrival (TDOA) algorithm by using position coordinates of the UWB positioning signal receiver and position coordinates of the UWB positioning signal transmitters as well as the differences in time and sending the time correction value to a positioning terminal, so that the positioning terminal calculates position coordinates of the positioning terminal according to the time correction value;

wherein the time correction value is transmitted, through a special wireless communication channel, to a central controller and each positioning terminal;

wherein the step of recording, upon receiving different UWB positioning signals sent from different UWB positioning signal transmitters at a certain time interval, the different receiving time to obtain a plurality of timing values comprises:

stopping, upon receiving a first arriving UWB positioning signal, one high-precision clock corresponding to the first arriving UWB positioning signal to obtain a timing value; similarly, stopping, upon receiving a second arriving UWB positioning signal, one high-precision clock corresponding to the second arriving UWB positioning signal to obtain another timing value, et cetera; and stopping, when a last arriving UWB positioning signal is received, one high-precision clock corresponding to the last arriving UWB positioning signal, to obtain a last timing value.

7. The positioning method according to claim 1, wherein the UWB high-precision positioning system comprises at least two UWB positioning signal receivers at a known position.

8. The positioning method according to claim 2, wherein the step (c) comprises:

(c1) each positioning terminal and the at least one UWB positioning signal receiver at a known position starting receiving synchronously the UWB positioning signal;

(c2) the at least one UWB positioning signal receiver at a known position stopping, upon receiving a first arriving UWB positioning signal, one high-precision clock corresponding to the first arriving UWB positioning signal to obtain a timing value; similarly, the at least one UWB positioning signal receiver at a known position stopping, upon receiving a second arriving UWB positioning signal, one high-precision clock corresponding to the second arriving UWB positioning signal to obtain another timing value, et cetera; and (c3) the at least one UWB positioning signal receiver at a known position stopping, upon receiving a last arriving UWB positioning signal, one high-precision clock corresponding to the last arriving UWB positioning signal to obtain a last timing value.

9. The positioning method according to claim 2, wherein the difference in time in step (d) refers to a difference in time at which any two different UWB positioning signals arrive at a same UWB positioning signal receiver at a known position.

10. The positioning method according to claim 3, wherein the difference in time in step (d) refers to a difference in time at which any two different UWB positioning signals arrive at a same UWB positioning signal receiver at a known position.

11. The positioning method according to claim 2, comprising at least two UWB positioning signal receivers at a known position, wherein the at least two UWB positioning signal receivers at a known position each send the calculated time correction value to the at least one central controller and/or each positioning terminal;

in step (f), each positioning terminal averages, after receiving the time correction values transmitted by the at least two UWB positioning signal receivers at a known position, the received time correction values to obtain an average value, and uses the average value as a time correction value of the positioning terminal, to remove, based on the time correction value, an offset and an error caused by rough synchronization control and circuit time fluctuation in the positioning terminal, to obtain a timing amount corresponding only to the distance between the positioning terminal and a respective positioning signal transmitter, and calculates position coordinates of the positioning terminal through the TDOA algorithm.

12. The positioning method according to claim 3, comprising at least two UWB positioning signal receivers at a known position, wherein the at least two UWB positioning signal receivers at a known position each send the calculated time correction value to the at least one central controller and/or each positioning terminal;

in step (f), each positioning terminal averages, after receiving the time correction values transmitted by the at least two UWB positioning signal receivers at a known position, the received time correction values to obtain an average value, and uses the average value as a time correction value of the positioning terminal, to remove, based on the time correction value, an offset and an error caused by rough synchronization control and circuit time fluctuation in the positioning terminal, to obtain a timing amount corresponding only to the distance between the positioning terminal and a respective positioning signal transmitter, and calculates position coordinates of the positioning terminal through the TDOA algorithm.

13. The positioning method according to claim 4, comprising at least two UWB positioning signal receivers at a known position, wherein the at least two UWB positioning signal receivers at a known position each send the calculated time correction value to the at least one central controller and/or each positioning terminal;

in step (f), each positioning terminal averages, after receiving the time correction values transmitted by the at least two UWB positioning signal receivers at a known position, the received time correction values to obtain an average value, and uses the average value as a time correction value of the positioning terminal, to remove, based on the time correction value, an offset and an error caused by rough synchronization control and circuit time fluctuation in the positioning terminal, to obtain a timing amount corresponding only to the distance between the positioning terminal and a respective positioning signal transmitter, and calculates position coordinates of the positioning terminal through the TDOA algorithm.

* * * * *